United States Patent [19]

Newhouse

[11] Patent Number: 5,149,141
[45] Date of Patent: Sep. 22, 1992

[54] INTERNALLY-LOCATED ROTATING UNION FOR A MOTOR-GENERATOR SET

[75] Inventor: Brian L. Newhouse, Apollo, Pa.

[73] Assignee: Westinghouse Electric Corp., Pittsburgh, Pa.

[21] Appl. No.: 42,184

[22] Filed: Apr. 24, 1987

[51] Int. Cl.⁵ .......................................... H02K 9/193
[52] U.S. Cl. .................................. 285/13; 310/61
[58] Field of Search ............... 285/13, 14, 276, 134; 310/61, 113

[56] References Cited

U.S. PATENT DOCUMENTS

| | | | |
|---|---|---|---|
| 1,733,379 | 10/1929 | Lowy | 310/61 X |
| 2,504,094 | 4/1950 | Turner et al. | 308/187 |
| 2,884,285 | 4/1959 | King, Jr. | 308/187.2 |
| 3,056,055 | 9/1962 | Willyoung et al. | 310/61 |
| 3,129,960 | 4/1964 | Schrodt | 285/134 X |
| 3,240,967 | 3/1966 | Kratschew | 310/54 |
| 3,475,631 | 10/1969 | Stark et al. | 310/58 |
| 3,476,961 | 11/1969 | Heard et al. | 310/54 |
| 3,519,861 | 7/1970 | Guthan | 310/87 |
| 3,558,942 | 1/1971 | Hill | 310/61 X |
| 3,577,002 | 5/1971 | Hall | 310/113 X |
| 3,733,502 | 5/1973 | Curtis et al. | 310/61 |
| 3,740,596 | 6/1973 | Curtis et al. | 310/54 |
| 3,742,266 | 6/1973 | Heller et al. | 310/54 |
| 3,845,639 | 11/1974 | Smith, Jr. et al. | 62/505 |
| 3,868,520 | 2/1975 | Curtis et al. | 310/61 |
| 3,957,294 | 5/1976 | Hoban et al. | 285/14 X |
| 4,114,059 | 9/1978 | Albaric et al. | 310/54 |
| 4,203,044 | 5/1980 | Linscott, Jr. | 310/61 |
| 4,207,745 | 6/1980 | Pouillange | 62/55 |
| 4,358,937 | 11/1982 | Okamoto et al. | 62/505 |
| 4,384,222 | 5/1983 | Zerlik | 310/61 |
| 4,574,210 | 3/1986 | Wieland | 310/59 |

Primary Examiner—Michael J. Carone
Attorney, Agent, or Firm—Z. L. Dermer

[57] ABSTRACT

A motor-generator set, which has a rotatable central shaft, AC and DC rotors tandemly-arranged along the shaft for rotation therewith and a liquid coolant flow path defined through the shaft and rotors, includes rotating unions mounted internally of the shaft within first and second axial bores defined in opposite ends thereof. Liquid coolant enters the axial bore at one end of the shaft and exits the axial bore at the opposite end of the shaft via the internally-located rotating unions. The rotating unions each includes features for collecting leakage of residual amounts of fluid from the bores past the unions, and fluid transmission coupling features being mounted respectively to the rotating unions for attachment to transmission lines for supplying and discharging fluid to and from the unions.

13 Claims, 3 Drawing Sheets

INTERNALLY-LOCATED ROTATING UNION FOR A MOTOR-GENERATOR SET

The invention described herein was made in the course of work performed under Contract No. N-00024-83-C-4181 awarded by the United States Government.

CROSS REFERENCE TO RELATED APPLICATION

Reference is hereby made to the following copending application dealing with related subject matter and assigned to the assignee of the present invention: "Water-Cooled AC and DC Motor-Generator Set on a Common Shaft with Series Cooling Flow Path" by Brian L. Newhouse, assigned U.S. Ser. No. 026,250 and filed Mar. 16, 1987, now U.S. Pat. No. 4,728,840.

BACKGROUND OF THE INVENTION

1. Field of the Invention

The present invention relates generally to cooling electrical power sources and, more particularly, is concerned with internally-located rotating unions used to supply and discharge liquid coolant to and from a rotor shaft of a motor-generator set.

2. Description of the Prior Art

Generally, internal circulation of liquid coolant through rotor shafts of turbine generators and motors to cool the same as they are rotating at high speed is a conventional practice. Many different designs of connections or joints for introducing the liquid into the rotor shafts and discharging it therefrom are known in the prior art. Representative of the prior art are the joints disclosed in Turner et al U.S. Pat. No. 2,504,094, King, Jr. U.S. Pat. No. 2,884,285, Krastchew U.S. Pat. No. 3,240,967, Smith, Jr. et al U.S. Pat. No. 3,845,639, Albaric et al U.S. Pat. No. 4,114,059, Pouillange U.S. Pat. No. 4,207,745, Okamoto et al U.S. Pat. No. 4,358,937, Zerlik U.S. Pat. No. 4,384,222 and Wieland U.S. Pat. No. 4,574,210. Also, many different versions of both external and internal (in-the-shaft mounted) rotating connections or joints, generally referred to as rotating unions, are manufactured by Deublin Company and Johnson Corporation.

While the many connections or joints of the prior art, such as those of the aforecited patents and those available from the aforementioned companies, would appear to operate reasonably well and generally achieve their objectives under the range of operating conditions for which they were designed, most seem to be unsuitable for delivering and discharging water coolant into and from the central shaft of a motor-generator set used in a nuclear submarine. Particularly, prior art designs would appear to have shortcomings in terms of one or more of the following criteria: resistance to shock loads, mechanical design simplification, reduced overall weight and volume, and maintenance requirements.

Consequently, a need exists for a rotating union design which will accommodate liquid coolant delivery and discharge into and from the motor-generator set rotor shaft in a manner which meets the aforementioned design criteria.

SUMMARY OF THE INVENTION

The present invention provides features which are designed to satisfy the aforementioned needs. The rotating union of the present invention is located totally within the shaft bore which eliminates direct application of shaft induced shock loads on the union bearings and seals, provides easy access to the seals upon removal thereof for maintenance, reduces overall shaft assembly length and eliminates the need for an external union support structure, thereby eliminating extra weight and required volume. The use of a nylon connection hose provides the flexibility required to allow the rotating union to move with the shaft end deflections and thus extend union bearing and seal life. The flexible hose for liquid connection provides additional benefits of eliminating a dense vibration path for any union bearing vibration transmittal. Still further, the nylon hose connections at each shaft end eliminates the possibility of electrical current flow leaving the shaft ends.

The function of the rotating union is to provide an interface between a stationary liquid coolant connection and the rotating rotor shaft. The union must resolve the problem of removing seal leakoff liquid if it is to be effective. One approach is to provide an annular shell at the shaft end to catch any leakage that may escape past the stationary seals. Thus, the shell provides an interface mechanism for removing the seal leakoff liquid. The need to have numerous dynamic seals to separate the main flow from the seal leakoff is eliminated.

Accordingly, the present invention is directed to a rotating union for use in transmitting a pressurized fluid from a stationary source to a passageway defined in a rotating shaft having an annular-shaped end section defining an open axial bore communicating with the passageway. The rotating union includes: (a) a tubular housing disposable within the bore in the shaft end section and having a hollow interior and axially-displaced inner and outer ends; (b) means for mounting the housing within the bore in the shaft end section for rotation with the rotating shaft and so as to define an open annular gap between the shaft end section and the housing; (c) a tubular pipe disposed in the hollow interior of the housing and having axially-displaced inner and outer ends and a central channel defined through the pipe; (d) means mounted to the outer end of the pipe for coupling a fluid transmission means, being connected to the stationary fluid source, to the pipe outer end for supplying fluid through the channel of the pipe to the passageway of the shaft; (e) means disposed between, and displaced from the inner ends of, the housing and pipe and rotatably mounting the pipe within the housing so as to define a space between the pipe and housing extending at least from the pipe-mounting means to the inner ends of the housing and pipe and to permit rotation of the housing relative to the pipe when the housing is mounted within the bore in the shaft end section and is rotating with the rotating shaft; (f) means spaced axially inwardly from the pipe mounting means and being disposed between and adjacent to the inner ends of the housing and pipe for effecting a seal therebetween which, except for leakage of only a residual amount of fluid past the seal and into a portion of the space extending axially between the pipe mounting means and the seal-effecting means, prevents any substantial backflow of fluid past the seal from the passageway of the shaft; (g) means defined through the housing for providing fluid communication between the space and the gap in order to allow the flow of the fluid leakage from the space to the gap; and (h) means mounted on the coupling means and defining a fluid leakage collection chamber in fluid communication with the gap for receiving flow of fluid leakage therefrom.

More particularly, the housing mounting means includes an annular flange on the outer end of the tubular housing, and a plurality of fasteners for rigidly connecting the housing flange to the end section of the shaft. Further, the annular flange is disposed in the fluid leakage collection chamber and has at least one groove defined therein which provides the portion of the gap which is in fluid communication with the chamber. The means rotatably mounting the pipe in the housing includes a set of axially spaced annular bearings, and an annular sealing member disposed at each opposite end of the set of bearings. The means defined through the housing for providing fluid communication between the space and the gap is in the form of a plurality of radially extending openings defined in the housing. The means defining the fluid collection chamber includes an annular-shaped shell mounted to the coupling means and surrounding the pipe adjacent to the outer end thereof so as to define the chamber thereof about the pipe, and a fluid transmission line connected to the shell in flow communication with the chamber defined therein for removing fluid therefrom.

The present invention is also directed to the combination in a motor-generator set, comprising: (a) a rotatable central shaft; (b) AC and DC rotors tandemly-arranged along the shaft for rotation therewith; (c) means defining a liquid coolant flow path through the shaft and rotors including open axial bores defined in opposite ends of the shaft; (d) rotating unions mounted internally of the shaft within the axial bores in the opposite ends thereof such that the liquid coolant can enter the one axial bore at one of the opposite ends of the shaft and exit the other axial bore at the other of the opposite ends of the shaft via the internally-located rotating unions with the unions each including means for collecting leakage of residual amounts of fluid from the bores past the unions; and (e) fluid transmission coupling means being mounted respectively to the rotating unions for attachment to transmission lines for supplying and discharging fluid to and from the unions.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
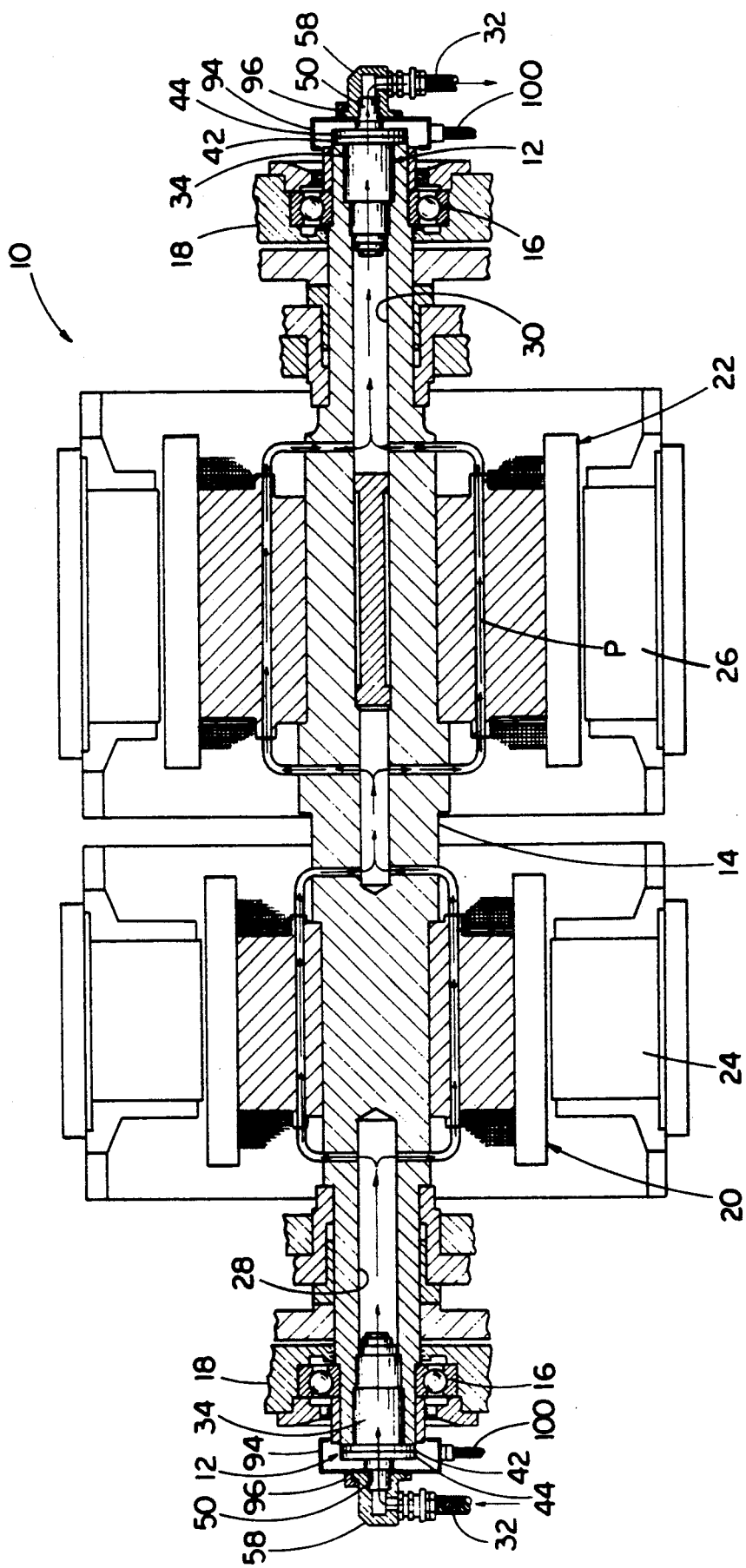
FIG. 1 is a longitudinal axial sectional view of a motor-generator set incorporating the internal rotating unions of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
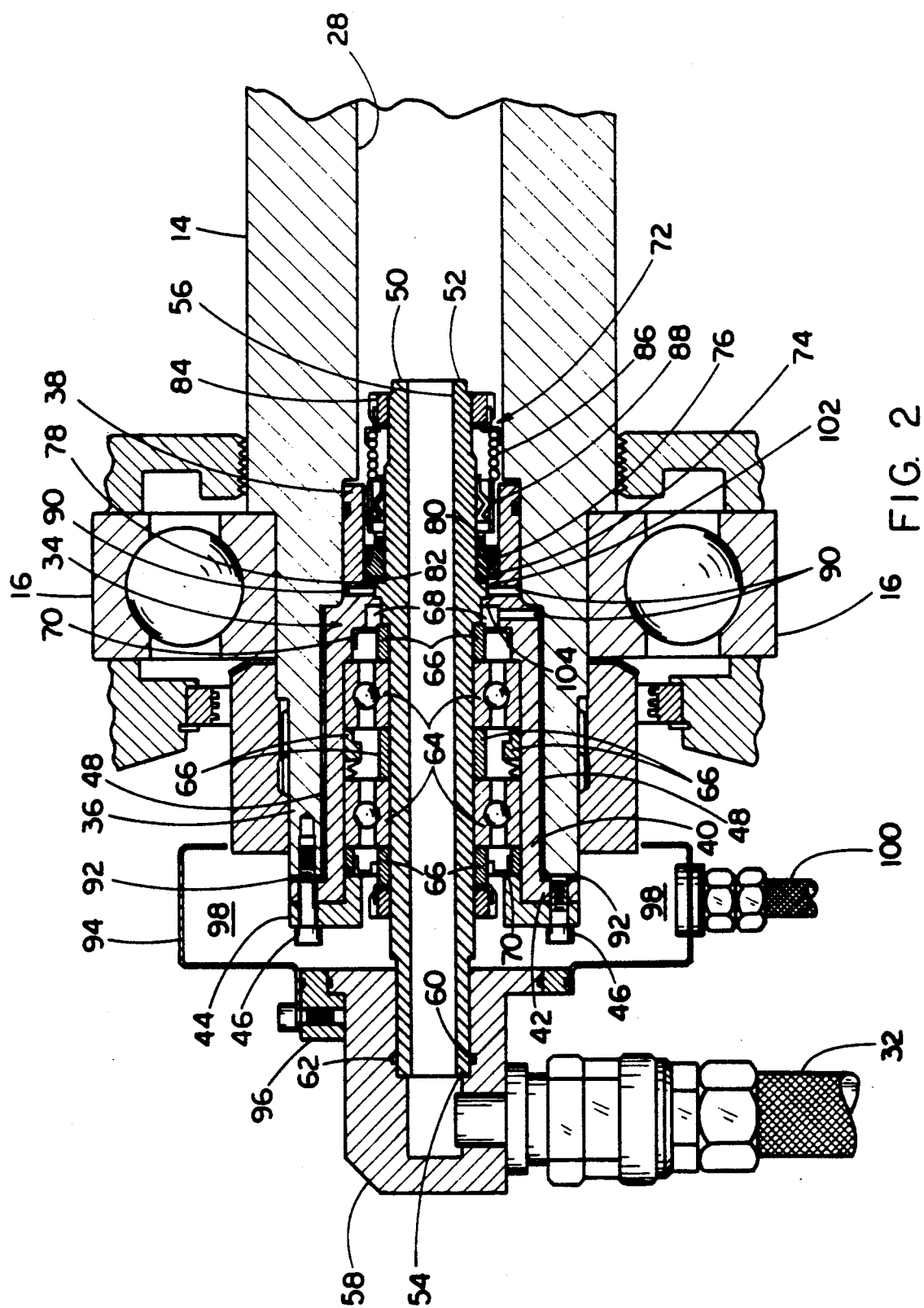
FIG. 2 is an enlarged longitudinal axial sectional view of the preferred embodiment of the internal rotating union at the left end of the motor-generator set of FIG. 1.

Referring now to the drawings, and particularly to FIG. 1, there is shown a motor-generator set, generally designated by the numeral 10, which incorporates a pair of internally-located rotating unions 12 that constitute the preferred embodiment of the present invention with the construction of one of the unions 12 being shown in greater detail in FIG. 2. Basically, the motor-generator set 10 includes a generally cylindrical central shaft 14 extending through a sealed housing (not shown) and being rotatably mounted at its opposite ends by bearings 16 which, in turn, are supported by end portions 18 of the housing. The set 10 also includes annular-shaped AC and DC rotors 20, 22 supported in tandem relationship along the central shaft 14 for rotation therewith, and annular-shaped stator cores 24, 26 which encompass the respective rotors 20, 22 in closely spaced relationship thereto. Also, a liquid coolant flow path, generally indicated by the arrows P in FIG. 1, is defined in a series relationship through the shaft 14 and the rotors 20, 22. The liquid coolant initially flows into and through a first axial bore 28 at the left end portion of the shaft 14 and lastly flows through and from a second axial bore 30 at the right end portion of the shaft 12. It should be understood that the rotating unions 14 can be used with the rotating shafts of other arrangements, and, thus, are not limited just to use with a motor-generator set as disclosed herein.

As depicted in FIG. 1, liquid coolant enters the first axial bore 28 at the left end of the shaft 14 and exits the second axial bore 30 at the right end of the shaft 14 via the internally-located rotating unions 12 which are the subject of the patent invention. The specific arrangement of the flow path through the rotors and shaft is not a part of the present invention and can take any of a variety of configurations. One highly advantageous arrangement is disclosed in the patent application cross-referenced above. The unions 12 are maintained in a coupled relationship to the rotatable shaft 14 as liquid coolant is routed through them from and to respective flexible hoses 32 attached thereto. Since the unions 12 are identical, the description which follows of the left one shown in FIG. 1 will suffice for the right one also.

As seen in the preferred embodiment of FIG. 2, the rotating union 12 includes a tubular housing 34 disposable within the first axial bore 28 in the end section 36 of the shaft 14. The housing 34 has a hollow interior and axially-displaced inner and outer ends 38, 40. The housing 34 of the union 12 includes an annular flange 42 on its outer end 40. The flange 42 and a retainer ring 44 overlying the flange (whose purpose will be described below) are rigidly fastened to the shaft end section 36 by a plurality of fastener screws 46 such that the housing 34 extends within the first axial bore 28 in the shaft end section 36 for rotation with the shaft 12. The housing 34 is spaced radially inwardly from the shaft end section 36 so as to define an open annular gap 48 therebetween.

In addition, the rotating union 12 includes a tubular siphon pipe 50 disposed in the hollow interior of the tubular housing 34. The pipe 50 has axially-displaced inner and outer ends 52, 54 and a central channel 56 defined therethrough. The outer end 54 of the pipe 50 has an end cap 58 threaded thereon for coupling one of the fluid transmission hoses 32, preferably fabricated of flexible nylon material, to the pipe outer end 54 for supplying liquid coolant from some suitable stationary source (not shown) through the channel 56 of the siphon pipe to the first axial bore 28 of the shaft 14. An O-ring 60 seated in a recess 62 in the end cap 58 engages the pipe outer end 54 for providing a seal between the end cap 58 and the pipe outer end 54.

The siphon pipe 50 is rotatably mounted within the housing 34 by a pair of axially spaced annular bearings 64 so as to permit rotation of the housing with the shaft 14 relative to the pipe. The bearings 64 are spaced from one another and positioned along the exterior of the pipe 50 by annular separators 66. Also, the bearings 64 are displaced from the inner ends of the housing 34 and pipe 50 and the respective exterior diameter of the pipe 50 and internal diameter of the housing 34 are sized so as to define a space 68 between the pipe 50 and housing 34. In addition, an annular sealing member 70 is disposed at each opposite end of the pair of bearings 64.

Further, the union 12 includes an annular seal assembly 72 spaced axially inwardly from the pair of bearings 64 and disposed between and adjacent to the inner ends 38, 52 of the housing 34 and pipe 50 for effecting a seal therebetween. The seal assembly 72 includes a mating ring 74 mounting an O-ring seal 76 which engages the interior of the housing 34. The mating ring 74 is restrained from rotation by a locking pin 78 mounted in an internal inwardly-facing shoulder 80 formed in the housing 34 and extending into a radial groove 82 formed in the mating ring. Also, the seal assembly 72 includes a locknut 84 fastened on the inner end 52 of the pipe 50 with a spring 86 compressed between the locknut and an annular band 88 so as to bias the band against the mating ring 74 to retain it in sealing relation against the housing shoulder 80. Except for minor leakage of only a residual amount of coolant liquid past the seal provided by the seal assembly 72 and into a portion of the space 68 which extends axially between the bearings 64 and the seal assembly 72 (which cannot readily be avoided), the seal assembly 72 is effective to prevent any major or substantial backflow of liquid past the seal from the first bore 28 of the shaft 14.

Still further, the union 12 includes features to remove and collect any leakage of liquid through the seal and into such portion of the space 68. Such features for removing the leakage are the aforementioned annular gap 48 defined between the housing 34 and the shaft end section 36, a plurality of radially extending openings 90 defined in the housing 34 which provide fluid communication between the space 68 and the gap 48 in order to allow the flow of the seal leakage from the space to the gap, and a plurality of circumferentially-spaced radially-extending grooves 92 defined in the annular flange 42 on the housing 34. The feature for collecting the leakage is an annular-shaped hollow shell 94 mounted by an end cap spacer 96 to the end cap 58 so as to surround the pipe 50 adjacent its outer end 54. The shell 94 defines a fluid leakage collection chamber 98 in which the annular housing flange 42 is disposed with its grooves 92 interconnecting the chamber 98 and the gap 48 in fluid communication with one another such that the chamber can receive flow of seal leakage from the gap through the grooves. Another fluid transmission line 100 in the form of a flexible nylon hose is connected to the shell 94 in flow communication with its collection chamber 98 for transmitting the collected leakage liquid away from the shaft 14. It will also be understood that the presence of the shell 94 serves as a protective cover to enclose rotating parts of the union 12 and inhibit entry of dirt and external moisture into the union.

The purpose of the retainer ring 44 which is rigidly attached to the shaft end section 36 along with the housing flange 42 is to hold the various bearings 64, separators 66 and sealing members 70 in place. It should be noted that the shell 94 has a large opening (not shown) defined in its inwardly-facing side through which extend in spaced relationship the end of the shaft 14, the housing flange 42 and the retainer ring 44.

The sequence of steps for assembling the above-described parts of the rotating union 12 together are basically as follows. First, the locking pin or pins 78 are installed in the housing shoulder 80. Next, the sealing members 70 are installed, one in the housing 34 and the other in the retaining ring 44. Now, the siphon pipe 50 is inserted into the housing 34 from the smaller diameter, inner end 38 thereof. The pipe 50 is inserted until an external annular ring 102 formed thereon abuts a complementary internal annular ring 104 formed on the housing 34. The rings 102, 104 will interfere with one another so as to prevent removal of the pipe 50 from the housing 34 later on after the housing has been assembled to the shaft 14. Next, the separators 66 and bearings 64 are installed on the pipe 50 in order from right to left, as seen in FIG. 2. Then, the retainer ring 44 is fastened to the housing flange 42 using the screws 46. Following next, the seal assembly 72 is applied to the inner ends 38, 52 of the housing 34 and pipe 50. While the end cap 58 is now threadable attached to the outer end 54 of the pipe 50, the remaining parts, i.e., the shell 94 and end cap spacer 96, are not assembled to the end cap 58 until the housing 34 and the pipe 50 therewith have been installed in the bore 28 of the shaft 14.

Figure 3:
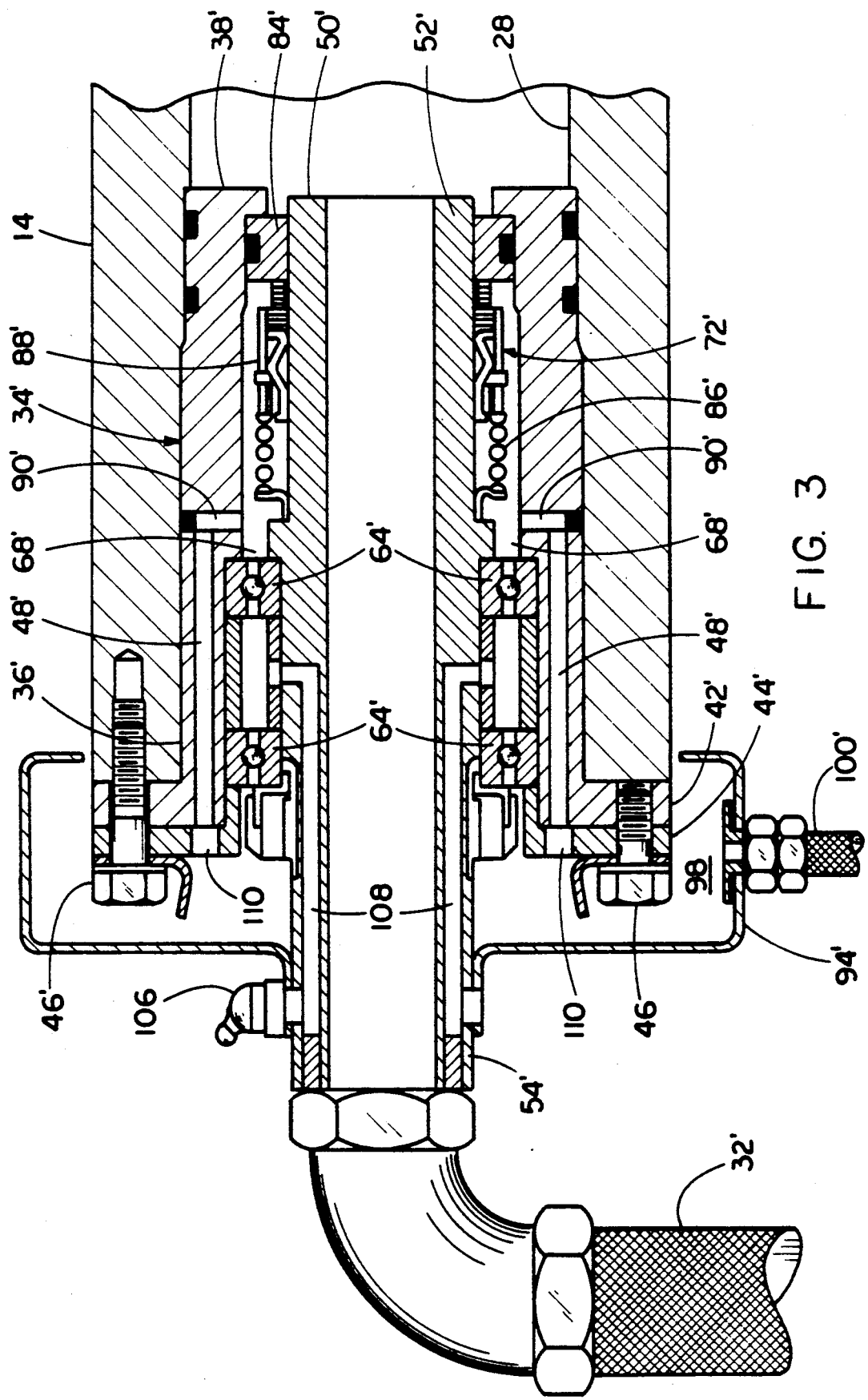
FIG. 3 is a longitudinal axial sectional view of an alternative embodiment of the internal rotating union.

The alternative form of the union 12' illustrated in FIG. 3 is generally similar to the preferred embodiment of FIG. 2 and so its comparable parts will be identified by the same reference numeral followed by a prime symbol. However, unlike the FIG. 2 embodiment wherein the bearings 64 are sealed, the bearings 64' in FIG. 3 are not and so a grease fitting 106 and passage 108 are provided to service and maintain the bearings 64'. Thus, the bearings 64' can be maintained without disassembling the union 12'. Also, the seal leakage path is slightly different in this embodiment in that openings 110 are provided through the retaining ring 44' instead of grooves 92 in the housing flange 42 as in the FIG. 2 embodiment.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A rotating union for use in transmitting a pressurized fluid from a stationary source to a passageway defined in a rotating shaft having an annular-shaped end section defining an open axial bore communicating with the passageway, said rotating union comprising:
   (a) a tubular housing disposable within the bore in the shaft end section and having a hollow interior and axially-displaced inner and outer ends;
   (b) means for mounting said housing within the bore in the shaft end section for rotation with the rotating shaft and so as to define an open annular gap between the shaft end section and said housing;

(c) a tubular pipe disposed in said hollow interior of said housing and having axially-displaced inner and outer ends, said pipe having a central channel defined therethrough;

(d) means mounted to said outer end of said pipe for coupling a fluid transmission means, being connected to the stationary fluid source, to said pipe outer end for supplying fluid through said channel of said pipe to the passageway of the shaft;

(e) means disposed between, and displaced from said inner ends of, said housing and pipe and rotatably mounting said pipe within said housing so as to define a space between said pipe and housing extending at least from said pipe-mounting means to said inner ends of said housing and pipe and to permit rotation of said housing relative to said pipe when said housing is mounted within the bore in the shaft end section and is rotating with the rotating shaft;

(f) means spaced axially inwardly from said pipe mounting means and being disposed between and adjacent to said inner ends of said housing and pipe for effecting a seal therebetween which, except for leakage of only a residual amount of fluid past said seal and into a portion of said space extending axially between said pipe mounting means and said seal-effecting means, prevents any substantial backflow of fluid past said seal from the passageway of the shaft;

(g) means defined through said housing for providing fluid communication between said space and said gap in order to allow the flow of said fluid leakage from said space to said gap; and (h) means mounted on said coupling means and defining a fluid leakage collection chamber in fluid communication with said gap for receiving flow of fluid leakage therefrom.

2. The rotating union as recited in claim 1, wherein said mounting means includes:
 an annular flange on said outer end of said tubular housing; and
 a plurality of fasteners for rigidly connecting said housing flange to the end section of the shaft.

3. The rotating union as recited in claim 1, wherein said annular flange is disposed in said fluid leakage collection chamber and has at least one groove defined therein which provides the portion of said gap which is in fluid communication with said chamber.

4. The rotating union as recited in claim 3, wherein said means rotatable mounting said pipe in said housing includes:
 a set of axially spaced annular bearings; and
 an annular sealing member disposed at each opposite end of said set of bearings.

5. The rotating union as recited in claim 3, wherein said means defined through said housing for providing fluid communication between said space and said gap is in the form of a plurality of radially extending openings defined in said housing.

6. The rotating union as recited in claim 5, wherein said means defining said fluid collection chamber includes:
 an annular-shaped shell mounted to said coupling means and surrounding said pipe adjacent to said outer end thereof so as to define said chamber thereof about said pipe; and
 a fluid transmission line connected to said shell in flow communication with said chamber defined therein for removing fluid therefrom.

7. In a motor-generator set, the combination comprising:
(a) a rotatable central shaft;
(b) AC and DC rotors tandemly-arranged along the shaft for rotation therewith;
(c) means defining a liquid coolant flow path through the shaft and rotors including open axial bores defined in opposite ends of said shaft;
(d) rotating unions mounted internally of said shaft within said axial bores in said opposite ends thereof such that the liquid coolant can enter the one axial bore at one of said opposite ends of said shaft and exit the other axial bore at the other of said opposite ends of said shaft via said internally-located rotating unions, said rotating unions each including means for collecting leakage of residual amounts of fluid from said bores past said unions; and
(e) fluid transmission coupling means being mounted respectively to said rotating unions for attachment to transmission lines for supplying and discharging fluid to and from said unions.

8. The motor-generator set as recited in claim 7, wherein each of said rotating unions includes:
 a tubular housing disposable within a respective one of said bores in said shaft ends and having a hollow interior and axially-displaced inner and outer ends;
 means for mounting said housing within said bore in said shaft end for rotation with said rotating shaft and so as to define an open annular gap between said shaft end and said housing;
 a tubular pipe disposed in said hollow interior of said housing and having axially-displaced inner and outer ends, said pipe having a central channel defined therethrough;
 means mounted to said outer end of said pipe for coupling a fluid transmission means, being connected to the stationary fluid source, to said pipe outer end for supplying fluid through said channel of said pipe to said bore of said shaft end;
 means disposed between, and displaced from said inner ends of, said housing and pipe and rotatably mounting said pipe within said housing so as to define a space between said pipe and housing extending at least from said pipe-mounting means to said inner ends of said housing and pipe and to permit rotation of said housing relative to said pipe when said housing is mounted within said bore in said shaft end and is rotating with said rotating shaft;
 means spaced axially inwardly from said pipe mounting means and being disposed between and adjacent to said inner ends of said housing and pipe for effecting a seal therebetween which, except for leakage of only a residual amount of fluid past said seal and into a portion of said space extending axially between said pipe mounting means and said seal-effecting means, prevents any substantial backflow of fluid past said seal from said bore of said shaft end;
 means defined through said housing for providing fluid communication between said space and said gap in order to allow the flow of said fluid leakage from said space to said gap; and
 means mounted on said coupling means and defining a fluid leakage collection chamber in fluid communication with said gap for receiving flow of fluid leakage therefrom.

9. The motor-generator set as recited in claim 8, wherein said mounting means includes:
an annular flange on said outer end of said tubular housing, and
a plurality of fasteners for rigidly connecting said housing flange to said end of said shaft.

10. The motor-generator set as recited in claim 9, wherein said annular flange is disposed in said fluid leakage collection chamber and has at least one groove defined therein which provides the portion of said gap which is in fluid communication with said chamber.

11. The rotating union as recited in claim 8, wherein said means rotatable mounting said pipe in said housing includes:
a set of axially spaced annular bearings; and
an annular sealing member disposed at each opposite end of said set of bearings.

12. The rotating union as recited in claim 8, wherein said means defined through said housing for providing fluid communication between said space and said gap is in the form of a plurality of radially extending openings defined in said housing.

13. The rotating union as recited in claim 8, wherein said means defining said fluid collection chamber includes:
an annular-shaped shell mounted to said coupling means and surrounding said pipe adjacent to said outer end thereof so as to define said chamber thereof about said pipe; and
a fluid transmission line connected to said shell in flow communication with said chamber defined therein for removing fluid therefrom.

* * * * *